A. B. MORSE.
UNIVERSAL JOINT.
APPLICATION FILED JUNE 5, 1919.
1,344,707.
Patented June 29, 1920.
3 SHEETS—SHEET 3.
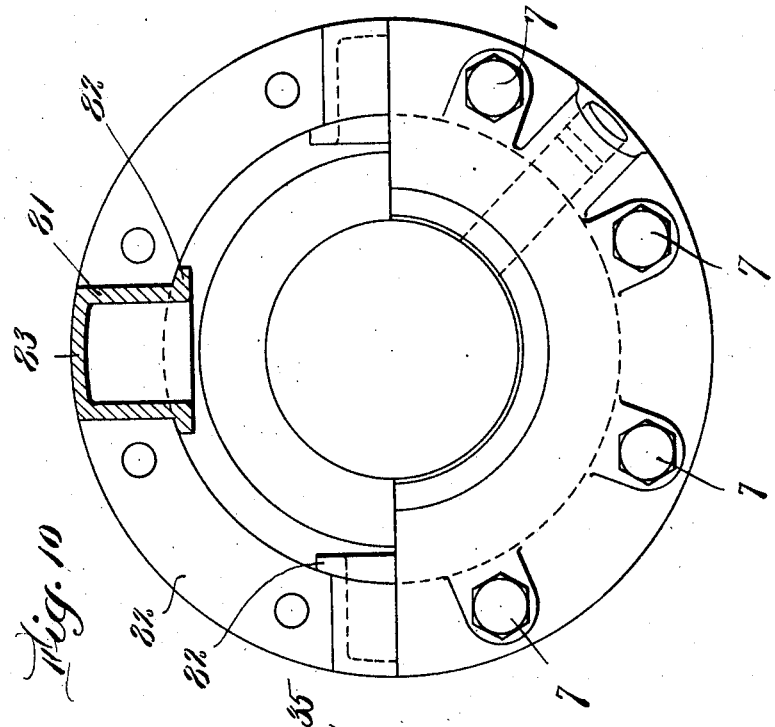
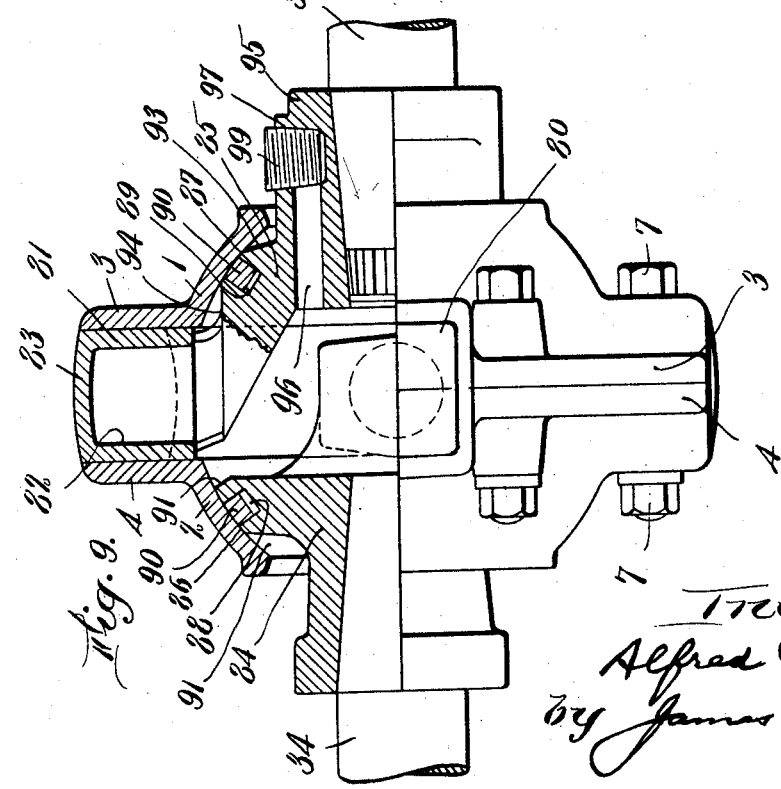
Inventor
Alfred B. Morse
by James R. Hodder
Att'y.

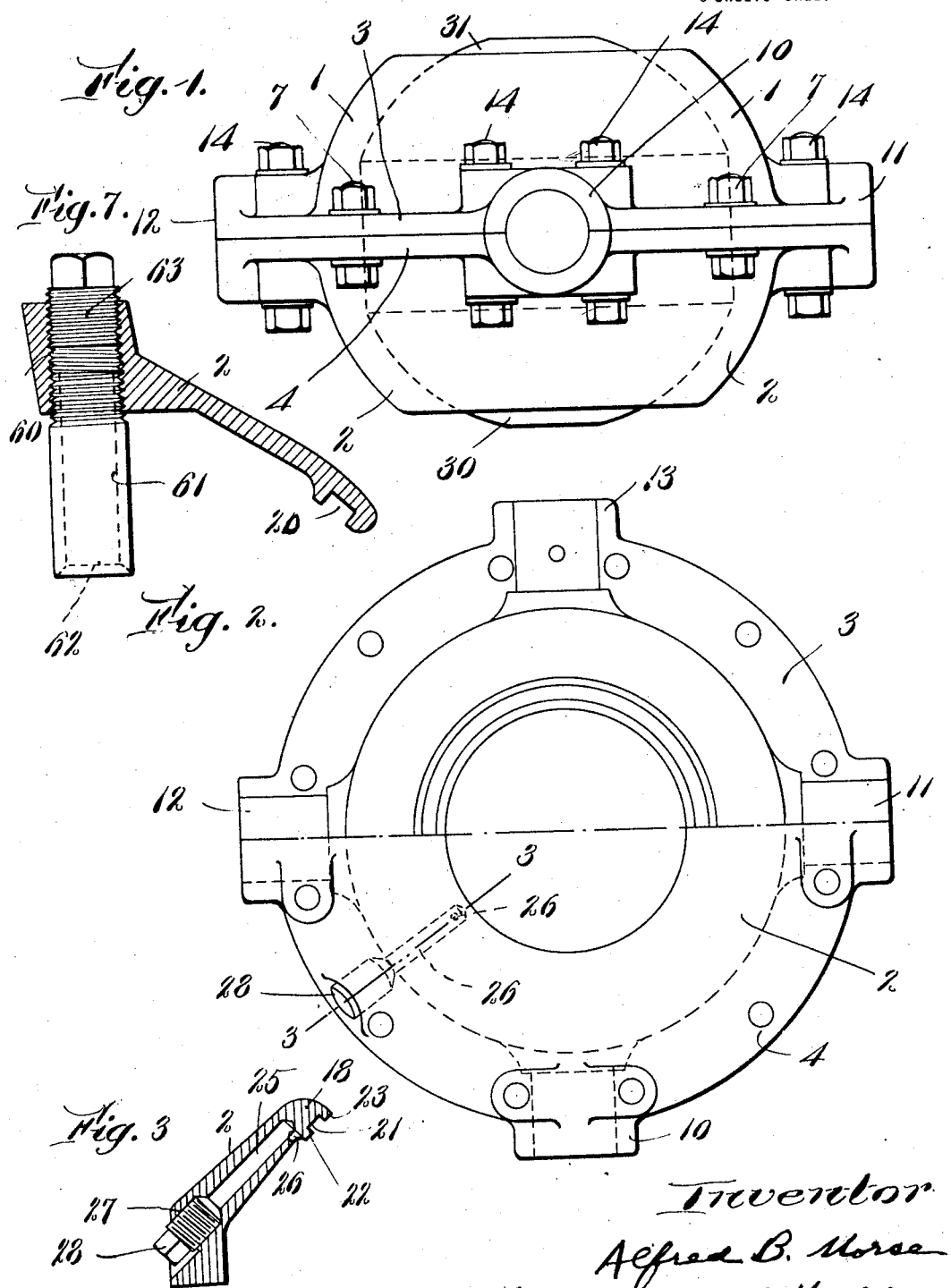

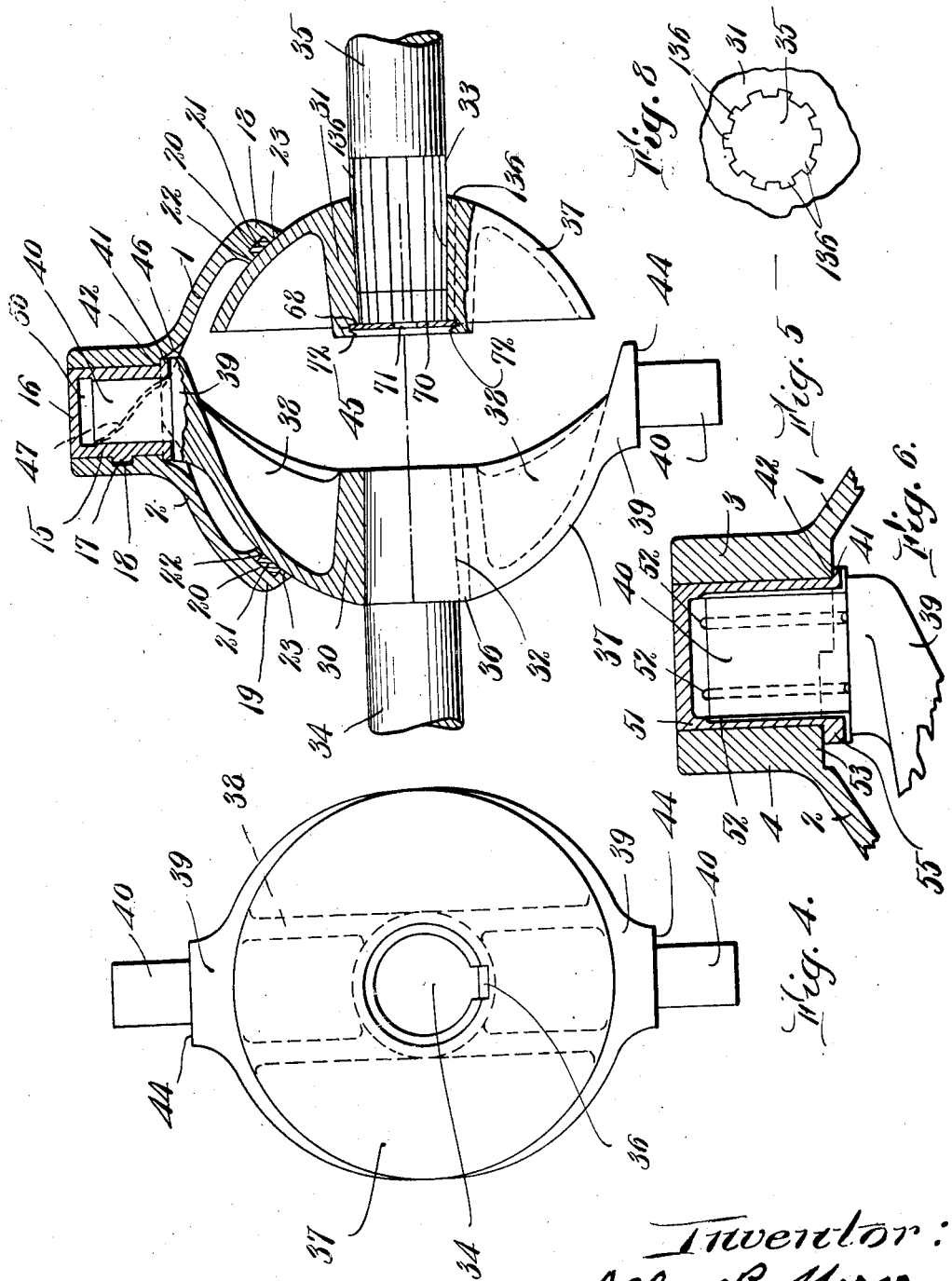

UNITED STATES PATENT OFFICE.

ALFRED B. MORSE, OF SOUTH EASTON, MASSACHUSETTS.

UNIVERSAL JOINT.

1,344,707.  Specification of Letters Patent.  Patented June 29, 1920.

Application filed June 5, 1919. Serial No. 301,935.

*To all whom it may concern:*

Be it known that I, ALFRED B. MORSE, a citizen of the United States, and a resident of South Easton, Massachusetts, (whose post-office address is South Easton, Massachusetts,) have invented an Improvement in Universal Joints, of which the following description, in connection with the accompanying drawings, is a specification, like letters on the drawings representing like parts.

My present invention is an improved type of universal joint construction and especially adapted to use where heavy loads and strains are transmitted. An important object of the present invention is to provide a very strong universal joint together with means for automatically lubricating the bearing portions, so forming the construction of the pivoted members as to permit the bearing surfaces to receive lubricant from an inner oil containing receptacle. In carrying out my present invention, I have utilized the centrifugal force incident to rotation of a universal joint to constitute the oil feeding means from an inner oil containing receptacle into the outer bearing portions. It will be appreciated that when an apparatus such as a universal joint is rotating, particularly when rotating at high speed, such as in shafting, automobile construction and the like, the tendency of prior oiling devices utilizing an oil cup or similar arrangements, was to throw the oil away from the bearing parts which it was intended to feed. I contemplate utilizing this centrifugal action and by so forming the universal joint to permit the retention of oil within the inner parts of the apparatus with appropriate conduits to the outer bearing surfaces, thus securing the advantages of a force feed of oil directly to the outer bearing surface of the universal joint. I believe that such construction, employing centrifugal force to constitute oil feeding means is a distinct novelty in devices of this type and I wish to claim the same broadly.

Further important features of the present invention consist in the particular arrangements and construction of the bearing parts whereby a considerable range of angular movement between the adjacent members is permitted while enabling the entire inner surface to act as an oil retaining receptacle; to provide efficient means for filling such an inner receptacle with oil while preventing danger of leakage; to afford an extremely strong construction and to provide a universal joint capable of having the outer casing and bearings removed for inspection, replacing of bushings or the like with the shafts leading into the universal joint at any angular position and without disturbing the same.

An additional feature comprises novel means to afford lubrication to one of the sliding shafts in the universal joint, although this can be applied to both shafts if desired, yet it is customary to have one shaft affixed and the other with provision for a relative sliding movement. By providing means within the entire construction to contain lubricant, I am enabled to form the interlocking keys or wedges for the sliding shaft in the particular fork adapted to carry same and then close the inner opening for the shaft by a small ring or washer having an aperture proportioned to supply just the correct amount of oil to lubricate the sliding joint. This prevents an excess of oil being supplied to this part of the apparatus and furthermore aids in maintaining the entire construction dust proof. Several modifications are also illustrated of supplying the bushings in an economical manner, holding them clamped firmly between the two halves of the casing while preventing their relative rotation.

My improved universal joint construction is particularly adapted for use in automobile trucks, where very heavy loads are transmitted and where it is important to have a substantially dust-proof construction and a relatively broad leverage for the pivots.

Referring to the drawings illustrating a preferred embodiment of the invention—

Figure 1 is an end view of my improved universal joint;

Fig. 2 is a longitudinal plan view with the upper half of one part of the casing removed;

Fig. 3 is an enlarged detail view illustrating the oil receiving means;

Fig. 4 is an end view of the inner hub; and

Fig. 5 is a view partly in cross section on the line of the shafts united by the universal joint.

Fig. 6 is an enlarged fragmentary view of a modified form of bushing;

Fig. 7 is an enlarged fragmentary view of a modified form of oil receiving means;

Fig. 8 is a cross sectional view through the fork carrying the interlocking grooves for the sliding shaft;

Fig. 9 shows a modification wherein the bushings are formed squared on their exterior and also a different form of the felt packing strips which utilize the centrifugal force to be maintained in contact against their contacting surfaces; and Fig. 10 is an end view of Fig. 9, with part of the casing removed.

I prefer to form the outer casing carrying the journal bearings for the inner hubs or pivots of two sections adapted to be bolted together to constitute a firm, rigid construction and to facilitate assembling, removal, or the like. To this end, I form two sections, 1 and 2, each partially spherical and with rigid flanges 3 and 4 respectively constituting the meeting edges, and means for uniting the two sections 1 and 2 of the outer casing. These two flanges 3 and 4 are united by bolts 7, 7—a plurality being provided around the rim,—and thus serves as a rigid, firm construction, both reinforcing and uniting the two casing members 1 and 2 together, firmly. I also utilize these flanges 3 and 4 as a portion of the lugs for the journal bearings 10, 11, 12, and 13 for the pivots of the inner members. I also provide a plurality of bolts 14, 14 at each journal bearing still further giving great rigidity of construction while permitting a quick and easy assembling, removal and reassembling of either section 1 or 2 to renew linings, give access to the interior of the mechanism, or for other purposes. These journal bearings are adapted to receive linings or bushings 15 (see Fig. 5) the latter preferably being of cup-shaped form constituting a covering 16 and each bushing is provided with a small boss 17 adapted to fit within a corresponding cored recess 18 formed in the casing to prevent the bushing 15 from rotating with the rotation of its contact pivot.

To provide a substantially dust-proof bearing surface between the outer casing members 1 and 2 and the inner hubs, I prefer to form the edge portion of each of the casing members 1 and 2 as an inwardly extending rim, shown at 18 and 19, Fig. 5. Each of these rims have a groove 20 to receive a packing strip 21 of felt or other suitable material and also affording metal bearing faces 22 and 23 for contact with the adjacent outer surface of the inner hubs to give added strength and take up undue torsional strain. This construction gives an added bearing surface and also a dust-proof oil-proof arrangement, so that the entire inner recesses of the universal joint may be filled with oil and also no dust will reach the trunnions and their bearings.

In one of the casings here shown as section 2 (see Fig. 3), I provide a bored passage 25 having an orifice 26 leading into the inner face of the casing and with the outer opening of the passage 25 enlarged and threaded at 27 and adapted to receive a correspondingly threaded cap 28. This permits oil to be supplied to the inner recess of the universal joint after it is entirely assembled and when that portion of the section 2 is uppermost so as to permit removal of the cap 28 and pouring the oil through the passage 25 to fill the entire oil containing recesses, by gravity. It will be noted that even with the cap 28 missing, yet the arrangement with the revised position substantially above the normal level of lubricant within the casing, oil will be prevented from a reverse flow therethrough owing to the carelessness of operators and chauffeurs, this safety feature is desirable and of importance.

The inner hubs 30 and 31 are formed with tapered, squared, or other contoured center recesses 32 and 33 respectively to receive the ends of the shafts 34 and 35 which it is desired to unite by the universal joint,—key 36 being supplied to the fixed shaft 34, while a sliding interlocking joint 36 for the shaft 35 is provided. These hubs are preferably formed with the outer spherical surface 37 and an inner web here shown as 38, 38 leading from the inner end of the hub 30 up to the end portions 39 carrying the trunnions 40, 40 at each end. These trunnions 40 are of appropriate size and diameter to fit snugly within the bushings 15. As the journal bearings 10, 11, 13 are all alike, the trunnions 40 for the hub 30 and the corresponding trunnions 40 for the hub 31 may be interchangeably fitted within either opposite pairs of journal bearings in the casing.

To hold the bushings 15 in position, I prefer to form the same with a small rim 41 adapted to rest upon a corresponding shoulder 42 around each bearing which constitutes also a lateral or thrust bearing for the corresponding shoulder 44 and the end portions 39 of each hub. In order to permit oil contained within the inner recess 45 of the universal joint to be thrown by centrifugal force and to flow into the bearings between the trunnions 40 and the adjacent bushings 15 I provide one or more grooves 46 leading from the inner recess 45 upwardly to each bearing and may also form a groove 47, shown in dotted lines, Fig. 5, around the inner surface of the bushing 15 to still further aid in feeding oil to all parts. As the cuplike bushing 15 is of greater depth than the length of the trunnions 40, an oil collecting recess 50 is left adjacent the end to still further assist in supplying lubricant in ample quantities to all bearing surfaces of the pivot or trunnions and their bearings.

In Fig. 6, I have illustrated a modified form of construction for the bushing 51. In this arrangement the pivot or trunnion 40 rotates within the bushing 51 having a plurality of oil distributing grooves 52, 52 and said bushing is retained in place between the hubs in the flanges 3 and 4, by a simpler means than the lug 17 and recess 18 illustrated in Fig. 5. In the present form, I prefer to core out a recess 53 substantially as an enlargement of the shoulder 43 against which the flange 41 of the bushing rests, forming a portion of this flange as indicated at 55 of appropriately greater height to coöperate with the recess 53 and thus retain the bushing in non-rotative engagement with the hubs of the outer casings. This construction also simplifies assembling and gives increased strength to the flange 41 and 55.

In Fig. 7 a modified construction is shown of the means to supply lubricant to the interior of the casing. As explained in Fig. 3, the recess 25 is bored therethrough but in a modified form illustrated in Fig. 7, the casing is simply bored directly through as shown at 60 and threaded, the inner portion being adapted to receive the threaded shank of a hollow tube 61 which projects a substantial distance between the interior of the casing. A threaded cap 63 acts to close the opening from the outside. Removal of the cap 63 permits oil to be poured through the hollow tube 61 in a manner similar to the method of filling the interior with lubricant as explained in the arrangement shown in Fig. 3. In both constructions of Figs. 3 and 7, the opening 26 in the former and the inner end of the tube 61 i. e. the opening 62 therethrough, are both sufficiently high to be above the normal level of lubricant within the casing when the universal joint is so positioned that that portion of the casing in which these oiling passages are positioned is lowermost and therefore in the position during which the lubricant would normally flow outwardly. In other words, with the arrangement as shown in Fig. 7, for example, wherein the same would be inverted from its position as shown in the drawing, the level of the lubricant therein would be below the opening 62 so that even if the cap 63 were omitted— or in the showing of Fig. 3, if the cap 28 were omitted—the lubricant within the casing would still be retained therein and would not escape. This construction is also of importance and is believed to be new and is claimed herein.

In Fig. 5, the shaft 35 and recess 33 are provided with interlocking grooves as clearly illustrated in Fig. 8, said shaft preferably being shorter than the hub 31. The inner end of the hub 31 is counter bored to form an annular shoulder 68 which receives a disk of washer 70 having a bored recess 71. The rim of the hub adjacent the shoulder 68 is then burred over as shown at 72 or other suitable means may be utilized to hold the washer 70 firmly in position, thus closing the recess 33 in the hub 31 and yet providing means for the lubricant within the casing to reach the sliding bearings in the interlocking grooves of the shaft 35 and hub 31 through the recess 71 in said washer. I prefer to so form this recess that just the right amount of oil will be supplied to keep the bearing surface properly lubricated.

In Figs. 9 and 10, I have illustrated a still further modified construction wherein the casings 1 and 2 and flanges 3 and 4 are similar and in fact substantial duplicates to those already described but in this construction, I am enabled to form the entire apparatus much more compactly and solidly. I also prefer to form hubs or recesses in the flanges 3 and 4 squared, as shown at 80, Fig. 9, to receive the bushings 81 which are correspondingly squared in outer contour but are, of course, circular, as shown at 82— to receive the trunnions of each fork. In this form however, I prefer to have the forks 84 and 85 respectively, cut with bearing surfaces 86 and 87 formed in the same arc as that of the inner casings 1 and 2 (see Fig. 9) in contact therewith and to cut the grooves 88 and 89 in which the felt packing 90 is fitted. This provides an oil tight construction between the forks and the coöperating portions of the casings 1 and 2 with the further advantage that centrifugal force during rotation of the universal joint tends to positively force the packing strips 90 against the casings, thereby effecting a rigid and tight bearing, automatically compensating for the wearing away of the contacting surface of the felt strips 90 until the same are entirely worn out. By recessing the forks, also as indicated at 91 and 92, on the fork 84 and 93 and 94 on the fork 85 a further advantage is secured of ample range of angular movement with compactness and strength. The squared journal bushings 81 are preferably formed with annular flanges, as clearly shown at 82, 82, Fig. 10, so made to allow the tops or caps of the bushings 83 to lie flush with the top of the flanges 2 and 3 and facilitate assembling, maintain the entire structure dust-proof and simplify construction. In this form it may not be desirable to use the oil receiving devices shown in Figs. 3 and 7 because of the greater compactness possible in this modified construction and also because the range of angular movement permitted would not allow of the same method of filling the interior of the casing with oil. Therefore I have herein shown a different method of supplying oil to the interior of the casings.

Referring to Fig. 9, I have bored the hub 95 of the fork 85 with an oil receiving recess 96 counter boring the same at 97 and threading a cap 98 into the correspondingly threaded counter bore 97.

The operation of my improved universal joint construction will be readily appreciated. With either the form shown in Figs. 1 to 5 or that illustrated in Figs. 9 and 10, the various portions of the casings, forks, and shafts may be readily assembled. One of the sections of the double casing, for example 2, can be first utilized, to which the four bushings are supplied. Thereupon the respective trunnions of the opposite pairs of forks are fitted to the corresponding bushings and this may be accomplished either with the shafts in alinement or disalinement positioned within the range or scope of angular movement through the joint as constructed. Thereupon the second half or section No. 1 is applied and the bolts 7 and 14 fitted and tightened. Oil is then supplied and as soon as the mechanism is rotated the centrifugal force thereof will positively force or fit the oil within the casing to flow outwardly in all directions supplying the lubricant directly into the bearings of the trunnions and their respective bushings through the grooves and openings left therefor. During the rotation of the apparatus also, oil will feed across the washer 70 and thus work through the recess 71 therein and supply lubricant to the sliding bearing of the shaft 35 in desired quantities. The arrangement of the casings 1 and 2 overlapping and contacting with the corresponding forks or hubs carrying the shafts supply an extra bearing surface for added strength, giving a relatively broad span for this additional bearing, in addition to that of the trunnions. It is in fact feasible for my type of universal joint construction to continue the transmission of power even should one or more of the trunnions be broken through this bearing of the casing on the hubs of the forks and thereby greatly increasing the safety and usefulness of this apparatus. With the felt packing 21 in the form shown in Figs. 1 to 5, it maintains the casing oil and dust-tight while in the form shown in Figs. 9 and 10, efficiency of the packing strips 90 is greatly increased through the centrifugal force tending to throw the same outwardly in positive contact with the adjacent bearing surface of the casing, increasing the life and usefulness of the strips by having the same so arranged and actually compensating for wearing away until entirely used up.

My present invention is further described and defined in the form of claim as follows:

A universal joint comprising two oppositely arranged shaft bearing heads provided with semi-spherical outer bearing surfaces, a two-part closing semi-spherical casing securing the heads together, bearing surfaces on the interior of said casing coöperating with said heads to maintain the same in position and act as bearings therefor, said heads and casing defining a closed chamber for lubricant, a tube extending through said casing and into the chamber to a distance beyond the ordinary level of the lubricant therein, a passage through one of said heads, a shaft mounted for sliding movement therein, a perforated closure for the interior end of said passage permitting a limited flow of lubricant to the shaft through the passage.

In testimony whereof I have signed my name to this specification in the presence of two subscribing witnesses.

ALFRED B. MORSE.

Witnesses:
JAMES R. HODDER,
RACHAEL L. CLARK.